May 13, 1952     W. W. CARSON, JR     2,596,812
WATER HEATER CONTROL
Filed March 2, 1949     2 SHEETS—SHEET 1
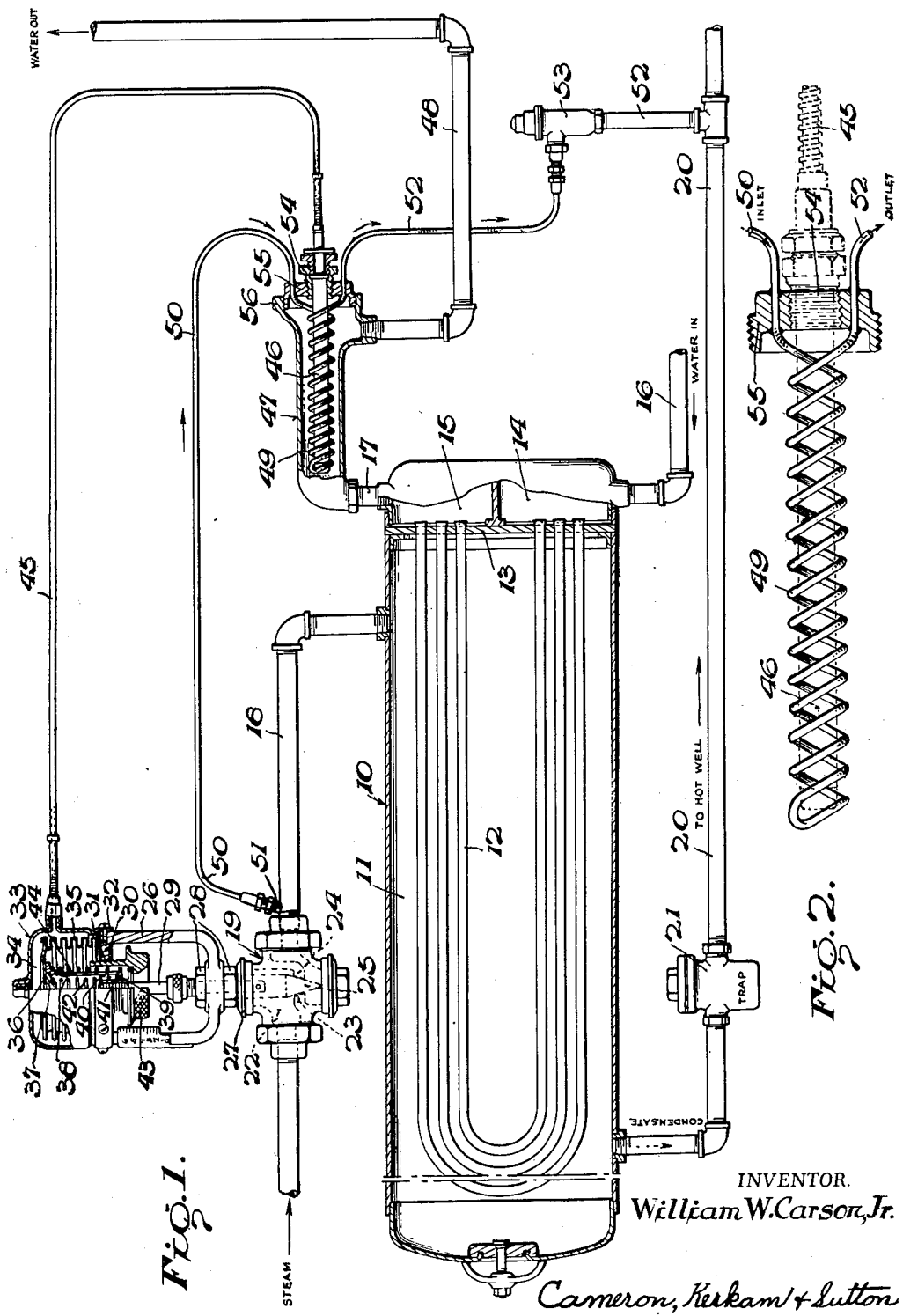
INVENTOR.
William W. Carson, Jr.
Cameron, Kerkam & Sutton
ATTORNEYS May 13, 1952 — W. W. CARSON, JR — 2,596,812
WATER HEATER CONTROL
Filed March 2, 1949 — 2 SHEETS—SHEET 2

Inventor
William W. Carson, Jr.
By Cameron, Kerkam & Sutton
ATTORNEYS

Patented May 13, 1952

2,596,812

UNITED STATES PATENT OFFICE 2,596,812

WATER HEATER CONTROL

William W. Carson, Jr., Knoxville, Tenn., assignor to Robertshaw-Fulton Controls Company, Knoxville, Tenn., a corporation of Delaware Application March 2, 1949, Serial No. 79,257

7 Claims. (Cl. 236—18)

This invention relates to temperature regulating means, and more particularly to a temperature regulating means for water heaters especially of the so-called instantaneous type, and is a continuation-in-part of my abandoned application Serial No. 16,683, filed March 24, 1948, for Water Heater Control.

Instantaneous water heaters as commonly found on the market have so much of their interior volume occupied by pipes in order to obtain maximum heating capacity that it is difficult if not impossible to install a temperature regulator bulb inside of the heater in order to control the steam supply directly from the water in the heater for maintaining a substantially uniform water temperature. Accordingly, it has been common practice to install the bulb of the regulator in the hot water outlet line as closely to the heater as possible. While this location of the bulb affords a fairly satisfactory control of the water temperature as long as the heater is working at or near to full capacity, wide fluctuations in water temperature are likely to occur when the demand for hot water drops well below the capacity of the heater, say below 75% of capacity. As the demand for hot water decreases, the amplitude of the temperature fluctuations tends to increase, the periodicity of the temperature cycles varying somewhat with the velocity of water flow and the amplitude of the temperature cycles tending to vary somewhat inversely to the water flow. Therefore, on decreased flow rapid temperature fluctuations on the order of 25 to 50° F. are not infrequent.

Another and serious condition arises when, with installations of the type above referred to, the flow of hot water is interrupted and a substantial period of time elapses before a fresh demand for hot water arises. In this case, with the regulator bulb installed as aforesaid, it tends to cool, due to radiation losses from or convectional currents in the pipe or chamber in which the bulb is disposed, to a point at which the temperature of the water to which the bulb is subjected calls for an opening of the steam valve. Steam is thereby admitted to the heater proper, increasing the temperature of the water therein, but as there is no flow of the heated water over the regulator bulb under these conditions, the bulb does not respond to the increasing temperature in the heater, so that the the water therein becomes overheated and may be brought nearly to the temperature of the steam. Then when water is first withdrawn from the heater this overheated water strikes the bulb of the regulator and causes the steam valve to close, and this condition persists until the greater part of the overheated water is consumed. In the meantime, the heater is being filled up with cold water which, when it reaches the bulb, causes the steam valve to be opened wide, a condition that persists until the cold water is replaced by a fresh batch of hot water. This cycling may persist for a considerable period of time causing wide and frequent variations in the temperature of the water delivered. Such wide and frequent variations of temperature are highly disadvantageous and sometimes dangerous when the heater is used in association with lavatories, shower baths, and the like, because the first water delivered may thus be at a scalding temperature.

The same temperature fluctuations, but different in degree, arise when the rate of flow through the heater is well below the capacity of the heater, and then the fluctuations may sometimes be cumulative, resulting in wide and frequent cycles of temperature variation.

The foregoing difficulties can be corrected, at least in part, by using a recirculating pump which maintains a vigorous and continuous circulation through the heater and over the regulator bulb. But in addition to the initial cost of the pump installation, this manner of seeking a more nearly constant temperature involves the expense of a constant input of power for driving the pump. Thereby energy losses due to recirculating the water may be substantial.

It is an object of this invention to provide an improved temperature regulating means for a water heater which obviates the foregoing wide and frequent fluctuations in the temperature of the hot water delivered, whether the heater is operating at less than full capacity or whether no water is being withdrawn from the heater for substantial periods of time.

Another object of this invention is to provide an improved temperature regulating means for a water heater which does not involve the costs implicit in the use of means for recirculating the water in order that the regulator bulb shall be subjected to temperatures corresponding with those of the body of water in the heater.

Another object of this invention is to provide an improved temperature regulating means for a water heater which avoids the wide and frequent fluctuations of temperature hereinbefore referred to at a minimum of expense both as respects initial installations costs and as respects energy consumption.

Another object of this invention is to provide an improved temperature regulating means for a water heater which employs a heater in association with the bulb of the thermostatically operated steam valve to so actuate said valve as to prevent wide fluctuations in the temperature of the water.

Another object of this invention is to provide an improved temperature regulating means for a water heater as last characterized wherein the bulb of the bulb heater combination is of improved construction so that cycling at the steam valve is minimized by the combinated action of the bulb and the heater.

Another object of this invention is to provide an improved temperature regulating means for a water heater which is simple in construction, adding little to the original installation, and which at the same time is highly efficient in operation, involving only small consumption of energy and therefore highly economical.

Other objects will appear as the description of the invention proceeds.

The invention is capable of receiving a variety of mechanical expressions only two of which are illustrated on the accompanying drawings, and it is therefore to be expressly understood that the drawings are for purposes of illustration only, and are not to be construed as a definition of the limits of the invention, reference being had to the appended claims for that purpose.

Referring in detail to the accompanying drawings wherein the same reference characters are employed to designate corresponding parts in the figures;

Fig. 1 is a somewhat schematic elevation of an instantaneous water heater provided with temperature regulating means embodying the present invention;

Fig. 2 is a fragmentary elevation to an enlarged scale of a preferred heater in association with the regulator bulb.

Figure 3:
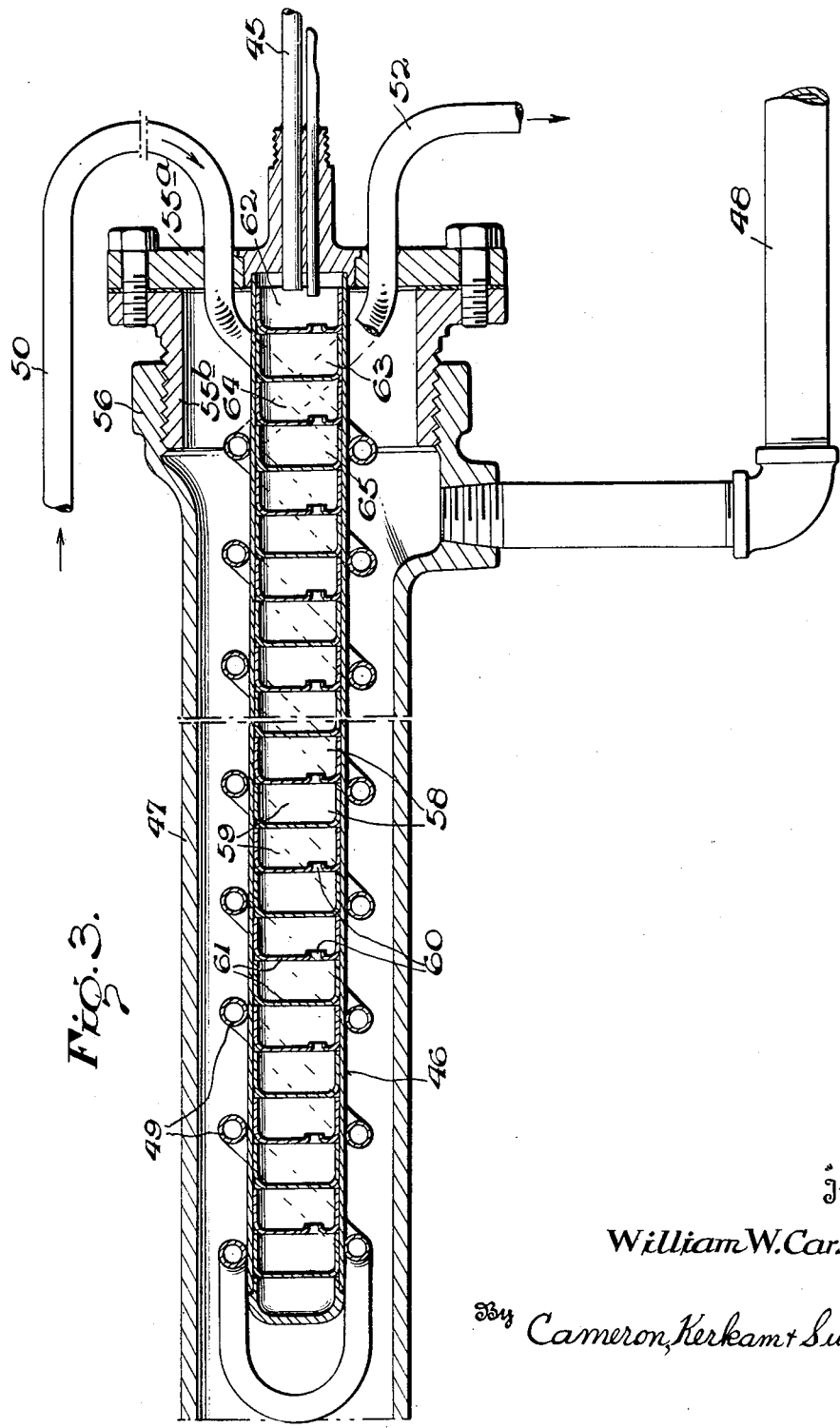
Fig. 3 is a fragmentary elevation to an enlarged scale showing a preferred type of bulb in association with a heater.

Referring in detail to the accompanying drawing, 10 designates the shell of an instantaneous water heater of any suitable type, size and construction, here illustrated as internally constructed to include a steam chamber 11 in which is disposed one or more suitable banks of tubes 12 opening at their opposite ends through header 13 into water inlet and outlet chambers 14 and 15, respectively. Inlet chamber 14 has in communication therewith any siutable conduit 16 through which cold water is delivered to the heater, while outlet chamber 15 has in communication therewith any suitable outlet conduit 17, which may be of any suitable length so as to dispose the regulator bulb, as hereinafter referred to, at an appropriate location, but by preference conduit 17 is made as short as possible so that the regulator bulb may be disposed closely adjacent to the outlet of the shell 10. In communication with the steam chamber 11 is any suitable steam conduit 18 in which is disposed a thermostatically controlled valve mechanism generally designated 19. Also in communication with said steam chamber 11 is any suitable outlet conduit 20 for the condensate and in which is preferably disposed a trap 21 of any suitable construction so as to prevent steam escaping before it has been condensed.

Any suitable thermostatically controlled valve mechanism may be used for controlling the flow of steam through inlet conduit 18 to the steam chamber 11. As shown by way of illustration, the valve mechanism 19 includes a housing 22 coupled into the steam inlet pipe 18 by suitable connections and having interiorly a partition 23 in which is a valve port 24 controlled by valve member 25 of any suitable form and construction. A frame 26 of any suitable form is mounted on the bonnet 27 of valve housing 22, being shown as secured thereon by nuts 28, and the valve stem 29 of the valve member 25 extends through a suitable guide opening in said frame. Frame 26 includes or has secured thereto a wall 30 provided with a threaded aperture 31, and suitably secured to the frame 26 in the plane of said wall 30, as by screws 32, is a generally cup-shaped housing 33 which constitutes the outer wall of an expansible and collapsible motor vessel 34 which is a part of the thermostat. The inner wall of motor vessel 34 as illustrated is composed of an expansible and collapsible corrugated tubular wall or bellows 35 formed integrally with or hermetically sealed to a movable end wall 36, the opposite end of said bellows 35 being hermetically sealed to the cup-shaped wall 33 as by means of a flange provided interiorly thereof.

Secured to or engaged with said movable end wall 36 is the end member 37 of a cylindrical cage 38 which at its inner end terminates in an inwardly directed flange 39. The outer end of valve stem 29 is threaded and carries an interiorly threaded collar 40 provided with an outwardly directed flange 41. Interposed between said flange 41 and the end member 37 is a coil spring 42 which normally holds the flanges 41 and 39 in engagement, so that movements of the movable end wall 36 are transmitted to the valve stem 29, but if the chamber 34 continues to expand after the valve member 25 is engaged with its seat 24, spring 42 may yield as movable end wall 36, through the cage 38, moves the flange 39 away from the flange 41, thereby providing an overrun known to the art. Threadedly mounted in the aperture 31 is a tubular nut 43 through the center opening in which the valve stem 29 extends, and between nut 43 and the movable end wall 36 reacts a spring 44 providing a resilient load for the expansible and collapsible motor vessel 34. By rotating the nut 43 to thread the same into or out of the aperture 31 the tension of the spring 44 may be adjusted and thereby the temperature at which the motor vessel 34 responds to the pressure developed by the thermostat may be adjusted, in a manner well understood in the art, to predetermine the temperatures at which valve member 25 is opened and closed to regulate the flow of steam through conduit 18 to chamber 11.

Communicating with chamber 34 is a conduit 45 of any suitable length, size and construction, preferably a capillary tube, leading to a bulb 46 of any suitable size, length and construction. Bulb 46, conduit 45 and motor vessel 34 constitute the thermostat and are charged with any suitable thermosensitive fluid so that variations of temperature at the bulb 46 will produce variations of pressure in the chamber 34 and thereby operate the valve member 25 in a manner well understood in the art.

Bulb 46 is mounted in any suitable way in a bulb housing 47 which at one end communicates with the water outlet conduit 17 and at or adjacent its other end has an outlet conduit 48 leading to the point or points at which hot water is to be consumed. While as respects the broader aspects of this invention bulb housing 47 may have any suitable location with respect to the shell 10 and conduits 17 and 48 may communicate with bulb housing 47 at any suitable points, it is preferred as illustrated to dispose the bulb housing 47 in a substantially horizontal position and connect the conduits 17 and 48 thereto at the underside thereof. Thereby the bulb housing 47 provides a substantially horizontal passage with inlet and outlet connections below the same, so that it tends to trap hot water around the bulb, preventing countercirculation within the water outflow line that would have the effect of removing temperature from around the bulb more rapidly than temperature is lost from the shell 10 with a consequent premature opening of the steam valve under the influence of the bulb 46.

Bulb 46 has associated therewith in the housing 47 a heater 49 which at its inlet end is shown as attached to the steam inlet pipe 18, through a conduit 50 of any suitable length, at any suitable point, preferably at or adjacent to the valve mechanism 19, being shown as connected to line 18 at 51 closely adjacent valve mechanisms 19 or it could be connected into housing 22 on the outlet side of port 24. The outlet end of the heater 49 is connected through a conduit 52 of any suitable length to the condensate conduit 20. If the size of the heater 49 is such that all steam flowing therethrough will condense therein and thereby prevent steam blowing through into the condensate line 20, no trap is required in the conduit 52. However, as illustrated, a trap 53 of any suitable construction may be interposed in the conduit 52 to assure that only condensate will flow from conduit 52 to the condensate line 20.

Heater 49 may be of any suitable construction, being shown as in the form of a coil surrounding the bulb 46, but this is not essential as the tubing of the heater may run lengthwise of the bulb. The tubing constituting the heater may be of any suitable size, depending somewhat upon the length of the tubing forming the heater. An inside diameter of $\frac{1}{16}$ inch to $\frac{3}{8}$ inch has been found sufficiently large for most purposes. When coiled around the bulb as illustrated the coils may be of any suitable size, spacing and character, the preferred arrangement as illustrated more particularly in the enlarged elevation of Fig. 2 comprising a coil having a double lead so as to comprise inlet and outlet sections through which the fluid flows in opposite directions in alternate turns. Thereby the inlet half of the coil extends the full length of the coil at evenly distributed points along the length thereof as does also the outlet half. The heater preferably extends the full length of the bulb 46 and the spacing of the component elements of the heater should be such as to allow free circulation of water around the bulb for intimate heat interchanging relationship therewith, and can vary within relatively wide limits, a spacing of one and one-fourth inches between the centers of adjacent turns of the coil having been found convenient and practicable when using $\frac{3}{8}$ inch tubing. The heater should be of such size that its component elements at least lie closely adjacent to the bulb 46, a spacing of less than $\frac{1}{16}$ inch being usually preferred, but a few of the component elements may desirably contact the bulb for the whole or a part of their respective turns. In some cases soldering of a few of the turns to the bulb has been found advantageous, but as too much physical contact between the heater and the bulb is likely to be disadvantageous, it should be possible for water to flow between the greater part of the heater elements and the bulb. A heater coil wound to provide a free sliding fit over the bulb has been found to be highly effective as the heater is close enough to the bulb to provide a good heating effect while at high rates of water flow there is sufficient flow of the water over the bulb to provide the desired cooling effect. In general the response characteristics of the bulb can be varied rather widely by the extent of contact or intimacy between the heater and the bulb, the more intimate the contact or spacing the greater being the speed with which the bulb is heated when steam is admitted to the heater but the cooling effect of the water flowing over the bulb being decreased. The objective being a compromise between prompt heat input to the bulb when no water is flowing and efficient removal of heat from the bulb when the water is flowing, so as to obtain a maximum net heating effect at the bulb at no water flow and a minimum net heating effect at the bulb at maximum water flow, varying conditions encountered in practice will dictate variations in the relationship of the heater to the bulb. For example, the lower the pressure of the steam the more intimate should be the heater with the bulb to get the desired heating effect.

The use of a coil with a double lead as heretofore referred to has the advantage of distributing the steam uniformly along the length of the bulb at all rates of flow, and it has the further advantage that both the inlet and the outlet ends of the heater are adjacent each other at the same end of the bulb and therefore, the heater may be installed in unitary relationship with the bulb for insertion into the housing 47. As illustrated, the bulb 46 is mounted by means of a tubular nut 54 in a member 55 having exterior peripheral threads to be received in the interiorly threaded extremity 56 of the bulb housing 47, and the conduits 50 and 52 leading to and from the heater 49 are also passed through and mounted in suitable apertures in said member 55.

While the invention as so far explained produces improved results when used with a thermostatic bulb of any suitable construction, superior results may be obtained by using a bulb-heater combination wherein the bulb is of the improved construction disclosed and claimed in my Patent No. 2,572,446, granted October 23, 1951. While any one of the bulbs disclosed in that application may be used to advantage in conjunction with a heater as here disclosed, a construction giving particularly efficient results is shown herein in Fig. 3.

Bulb type regulators operating on the vapor pressure principle and using conventional bulbs, when employed for controlling steam, are likely to cause an excessive opening of the valve when there is a sudden drop in the temperature at the bulb. A sudden drop at the bulb, even of only a few degrees, causes a condensation of the vapor in the bulb thereby reducing the pressure within the bulb. Liquid accordingly flows into the bulb from the tube or passages connecting the bulb with the motor vessel that operates the valve. This tube is conventionally exposed to air temperature, and hence the liquid flowing into the bulb is relatively cool as compared with the temperature of the fluid in the bulb subjected to the temperature of the water. This influx of cold liquid causes further condensation of the vapor in the bulb with consequent further inflow of cold liquid, and so on, with the result that the pressure in the motor vessel is decreased excessively and the steam valve is opened excessively for the temperature requirements at the bulb. While the valve will in time be returned to its correct position when the bulb has absorbed enough heat to bring the temperature of the entire volume of fluid in the bulb to the temperature of the water to which the bulb is subjected, there is a period when the steam valve is open to excess, which causes overheating of the water, and this action in the case of instantaneous water heaters has been found to induce wide and continuous cycling of the regulator.

Such cycling action is overcome by using a bulb as shown in Fig. 3, here shown as carried by a plate 55a bolted to a sleeve 55b threaded into extremity 56 of housing 47. As here illustrated, the interior of the bulb is subdivided into a plurality of small compartments formed to trap vapor in each of said compartments while permitting relatively free flow of liquid between the several compartments. The interior of the bulb may be subdivided into any suitable number of compartments, depending upon the response desired at the bulb as hereinafter explained, and the compartments may be formed in any suitable way. As shown, shallow cups 58, preferably formed of a good heat conducting material such as brass, are made of such diameter that they constitute a snug fit with the interior wall of the bulb and of such depth that when pushed into contact with each outer as shown in Fig. 3 they form a plurality of cells 59 whose axial dimension is determined by the depth of the cup. The bottom of each cup is perforated as shown at 60, and in order to provide for turbulence within the respective cells the apertures 60 in the bottoms of adjacent cups are preferably placed out of alignment with each other so that the apertures in adjacent cells are staggered with respect to each other. Said apertures 60 are preferably so disposed that when the bulb is installed the apertures are adjacent the bottom of the bulb because, as is apparent, any liquid below the level of the apertures cannot flow from one cell to another. One or more apertures may be used in the bottom of each cup, but a single aperture is preferred. Different sized apertures may be employed depending upon the extent to which it is desired to retard the flow of liquid from one cell to another, but generally it is preferable to make the apertures large enough so that the liquid may flow relatively freely from one cell to another and in the preferred construction the apertures are made somewhat larger than the bore of the capillary tube 45 which constitutes the means of communication between the bulb 46 and the motor vessel 34. Thus when using a capillary tube of ⅛" inside diameter, apertures of 3/16" diameter have been found to be highly effective. It is preferred to have the cells 59 extend the entire length of the bulb, but some of the advantageous results secured can be obtained by disposing a fewer number of cells than required for occupying the entire length of the bulb but at the end of the bulb with which the tube 45 communicates.

The subdivision of the interior of the bulb into a plurality of cells as explained effects two important functions which are closely interrelated as will now appear. In the first place, the bottoms of the cups 58 constitute fins 61 which, through the side walls of said cups, are in direct and intimate heat interchanging relationship with the wall of the bulb 46. Therefore, upon a change in temperature in the water in the heater housing 47, or the energization of the heater 49, heat may flow quickly through the fins 61 into or out of the interior of the bulb where said fins are in intimate heat interchanging relationship with small bodies of fluid owing to the subdivision of the interior of the bulb into a number of cells 59. Thereby the vapor and liquid in the bulb respond quickly to changes of temperature in the water in the heater housing and to the action of the heater 49. In the second place, the subdivision of the interior of the bulb into a plurality of cells dampens out the tendency of the relatively cold liquid flowing into the bulb, when there is a sudden drop of temperature at the bulb, to cause cycling of the steam valve. Thus assume that the bulb 46 is installed horizontally as shown in Fig. 3. It contains a body of vaporizable liquid with a superimposed body of vapor of that liquid. The liquid in the several cells 59 may flow freely from one cell to another through the apertures 60 disposed adjacent the lower portion of the fins 61, but the vapor above the liquid is trapped in each of said cells because the liquid normally covers the apertures.

If there is a sudden drop of temperature at the bulb the vapor in the several cells is quickly condensed to conform with the vapor pressure of the new temperature, the fins 61 facilitating rapid heat interchange between the relatively small bodies of vapor in the several cells and the surrounding water in the heater housing 47. This causes liquid to flow into the bulb from the capillary tube 45 and as said tube is conventionally subjected to the air it is at a temperature below that within the bulb. This cold inflowing liquid may condense all of the vapor in the first cell designated 62. As the aperture 60 communicating with the cell 62 is preferably larger than the internal bore of the capillary tubing 45 as above explained, such condensation of vapor in cell 62 results in hot liquid flowing into the cell 62 from the next adjacent cell designated 63, thereby raising the temperature of the liquid in cell 62. At the same time the liquid in cell 62 is in intimate heat interchanging relationship with the fin 61 that defines one wall of said cell 62, which aids in further raising the temperature of the liquid in said cell. Continued inflow of liquid from the capillary tube 45, as the vapor in the bulb condenses, displaces the liquid in cell 62, which is now at a higher temperature than when it entered, into the cell 63. Here the action is repeated but to a less extent because the liquid entering cell 63 is at a higher temperature. The liquid so entering cell 63 will cause condensation of vapor therein with resultant inflow of warm liquid from the next adjacent cell designated 64, further raising the temperature of the liquid in cell 63. Further inflow of cold liquid from capillary tube 45 will cause further displacement of the liquid in cells 62, 63 and 64, but the liquid flowing to the next adjacent cell designated 65 is at a still higher temperature.

Therefore, the liquid flowing into each of the cells in succession is of progressively increasing temperature because of intermixture with warmer liquid and because of the rapid heat conduction through the fins 61 acting intimately on small bodies of liquid, so that the condensing effect of the inflowing cold liquid on the vapor is progressively less as each successive cell is reached. Thereby, before the chilling effect of the inflowing liquid on the vapor trapped in the several cells is effective to cause an excessive opening of the steam valve, the progressive heating of the inflowing liquid in successive cells, aided by the rapid heat flow through the fins 61, results in the gradual disappearance of said chilling effect before it can act on most of the vapor trapped in the several cells and therefore well before any excessive condensation of vapor occurs. Hence the opening of the steam valve is retarded because excessive condensation in the bulb is prevented, the chilling effect of the inflowing liquid being diminished progressively in each succeeding cell.

The intimate mixture of hot and cold liquid in each of these cells is facilitated by the turbulence which is increased by the staggered relationship of the apertures 60, and at the same time this turbulence increases the heat flow through the fins 61, as well as the bulb wall, by greatly speeding the transfer of heat to and from the liquid. Since there is a relatively small amount of liquid and vapor in each cell, they are both always closely adjacent to a heat transferring surface so that only slight movement or turbulence of the liquid is required to bring all parts of the liquid in contact with such surface. Movement of liquid into or out of one cell produces movement and turbulence in one or more adjoining cells, with consequent movement and turbulence extending in many or most cases throughout the length of the bulb, thereby greatly increasing the opportunity for transfer of heat retween bulb wall and liquid. By varying the size of the apertures 60, and thereby the rate at which liquid flows from one cell to another, the rate at which the chilling effect of the inflowing liquid can be damped out can be nicely predetermined, and therefore the rate and extent of opening of the steam valve can be similarly controlled. By using a bulb construction as explained the steam valve can therefore be made to respond accurately and sensitively to the changes of temperature at the bulb due to the action of the heater and variations in the water temperature and cycling of the steam valve arising from cold liquid entering the bulb is prevented.

In operation of water heater and its thermostatic control, when the temperature of the water in the bulb housing 47 decreases to that degree at which the thermostat 46, 45, 34 is set to effect an opening of the steam valve 19, said valve is actuated to admit steam to the chamber 11, but simultaneously steam flows from the inlet conduit 18 through conduit 50 to the heater 49 which is closely adjacent to or partly in contact with the bulb 46, so that said bulb 46 is heated simultaneously with the heating of the water in the tank 10. Therefore, even though there is no flow of water from the shell 10 through the water outlet conduits 17 and 48, the bulb 46 will respond to the temperature derived from the heater 49 so as to effect closure of the steam valve 19 when the temperature of the water in the shell 10 has approximated the desired maximum degree. Thereby overheating of the water in the shell is eliminated.

Bulb housing 47 is preferably of such construction and material, or it may be provided with suitable insulation, that its rate of heat loss will correspond with the rate of heat loss from the shell 10 to the end that there will be at least a rough correspondence between the temperature in the bulb housing 47 and in the shell 10. Therefore, the temperature in the housing 47 will not decrease to a temperature that effects the opening of the steam valve 19 until the temperature of the water in the shell 10 has lowered to a degree approximating that at which admission of steam to the heater is appropriate. The foregoing operation is facilitated by the disposition of the bulb housing as heretofore explained with the conduits 17 and 48 leading into and out of the same at the lower side thereof, because the housing acts in the nature of a trap to prevent convection currents therein, trapping the hot water in contact with the bulb.

When water is withdrawn from the heater, even at a relatively low rate, the bulb 46 responds sensitively to the water flowing through the housing 47 and if the temperature thereof is below that at which the heater is designed to supply hot water, the bulb 46 responds to effect the opening of the valve mechanism 19. Again, the steam is admitted simultaneously to the heater 49, subjecting the bulb to the heating effect of the heater 49. This has what may be called a snubbing effect on the response of the bulb if the temperature of the outflow water is below that intended to be maintained, tending to prevent movement of the valve mechanism 19 to wide open position on the one hand and effecting its earlier movement toward closed position on the other hand, so as to prevent the cycling action heretofore referred to. Therefore when the water flow is below capacity the coil around the bulb creates somewhat of a false temperature because of its heating effect on the bulb 46, the amount of the false temperature being inversely proportional to the rate of heat removal due to rate of water flow. A temperature regulator such as here used requires a temperature differential to effect movement of the steam valve from closed to wide open position, and the false temperature so produced at the bulb, when the water is flowing slowly, causes the regulator to respond as if the temperature of the water were several degrees hotter than it actually is. This is advantageous because it tends to forestall overheating of the water at low rates of flow and therefore reduces the variations in temperature of the water between high and low rates of flow. On the other hand, when the rate of flow of the water from the shell 10 is high the impingement of the water on the bulb and coil, the turbulence of the flowing water and the velocity of its flow through the housing 47 results in the absorption by the flowing water of the heat delivered by the heater 49 whereby it is carried away rapidly, being insufficient in amount to materially effect the temperature of the water. The bulb 46 now responds primarily to the temperature of the outflowing water as if the heater 49 were not present.

In other words, as long as steam is being supplied to the main heater, it is also being supplied to the bulb heater 49 which is in at least partial metallic contact with the bulb. Consequently, whenever steam is flowing to the main heater, the bulb is always being heated and operating at a temperature which is higher than that of the surrounding water, the temperature differential varying with the rate of water flow. This difference may be as high as 15° to 20° F. at periods of low water flow and only 1° or 2° F. at periods of high water flow. Even though the temperature of the steam is always substantially higher than that of the water this removal of heat from the bulb 46 by the flowing water will keep the bulb temperature down and prevent the main steam valve from being closed as long as the temperature of the water does not exceed the predetermined degree for which the instrument is set.

Low water velocities extract less heat from the bulb than do high water velocities even though the water temperature does not change. Therefore, the instant water flow is cut from high to low the bulb temperature begins to rise, because of the lower rate of heat removal, without waiting for a change in the water temperature in the bulb housing. Thereby the bulb acts to anticipate the change in water temperature. A corrective action is accordingly initiated at the main steam valve within a fraction of a second without waiting for a change in the water temperature entering the housing 47. Similarly, an increase from low flow to high flow has an immediate effect, the increase in water velocity abstracting more heat from the bulb to lower the temperature thereof before there is any change in the water temperature entering the housing 47.

When there is no delivery of water from the heater for any length of time the bulb will stay at that temperature which is required to keep the main steam valve closed unless the temperature of the water in the bulb housing 47 drops below the predetermined temperature at which the bulb 46 is to initiate opening of the main steam valve and which may be 15° or 20° F. above the predetermined temperature to be maintained in the water in the shell 10. However, the first demand for water will draw the water from the housing 47 into the line, but as its volume is relatively small as heretofore pointed out, and as the pipe walls will have cooled to some extent during the period of zero demand, the excess heat in the small body of water withdrawn from the housing 47 will be quickly dissipated by absorption by the pipe walls and have little or no perceptible effect on the temperature of the water delivered. At the same time the cooler water from the shell 10, which as before pointed out may be 15° or 20° F. below the bulb temperature, at once contacts the bulb and by abstraction of heat effects the opening of the steam valve so that steam flows both to the main heater and to the bulb heater 49. Thereby the bulb temperature is promptly restored to a value which, as before pointed out, depends on the rate of water flow as well as on variations in the temperature of the water itself.

If steam pressure increases for any reason, assuming constant water flow, there will be an increase in steam flow past the main steam valve, but as the ratio of frictional resistance in the steam lines to the main heater and to the bulb heater remains constant, there is a proportionate increase of steam flow to the bulb heater, causing the bulb temperature to increase and thereby anticipate the increased heating effect at the main heater before the water of higher temperature due to the increased steam flow reaches the bulb housing 47. Again, the change in water temperature is anticipated before such change reaches the bulb. In other words, additional steam flow from any cause effects a supply of additional heat to the bulb at substantially the same instant that the additional heat begins to enter the water in the main heater, although the timing may be predetermined to some extent by varying the sizes or lengths of the respective steam lines. Accordingly, the bulb begins to respond to the temperature change before water flow conveys this change to the bulb. This anticipation of a coming temperature change in the water tends to keep the movement of the main steam valve in step with the actual steam requirements, eliminating the tendency of the main steam valve to cycle or damping out any cycling action which may have been induced by outside influences.

Therefore, whether the withdrawal of water is low as compared with the capacity of the heater or whether no water is being withdrawn from the heater, even for substantial periods of time, the application of heat by the heater 49 to the bulb prevents overheating of the water in the shell 10 and the wide and rapid fluctuations of temperature in the outflow water due to the excessive movements of the thermostatically controlled valve which have heretofore characterized installations using a thermostat subjected to the temperaure of the water in the outflow conduit. Tests have shown that with an installation producing rapid variations of temperature in the outflow water of 25° F. or more when operating at a 50% capacity and delivering steam after a period of about twenty minutes when no water was withdrawn, the use of a heater 49 as heretofore explained in association with the bulb kept the temperature variations within 3° F. at any load, and when there was no delivery of hot water for as much as an hour or more not only was no steam delivered when consumption was resumed but no serious overheating of the water had occurred in the shell 10. On the other hand, all of the heat delivered by the steam in the heater 49 goes to the water in the housing 47, and except for such slight heat loss as occurs through the wall of the housing 47 the provision of the present invention operates without substantial energy loss. Thereby, without substantial consumption of energy such as necessarily characterizes provisions for recirculating the water through the chamber in which the bulb of the thermostat is disposed, the wide and rapid variations in the temperature of the water delivered have been overcome economically both when the rate of consumption is below the capacity of the heater and when the heater has not been called upon to deliver hot water for a substantial period of time. The foregoing advantages arising from the use of the heater are aided and facilitated by using the improved bulb construction disclosed, which also prevents cycling of the steam valve arising from sudden inflow of the thermostatic liquid into the bulb when there are sharp drops in temperature at the bulb. The present invention adds little to the cost of the installation, heat losses due to its use are insignificant in amount, and therefore the present invention provides a highly efficient provision for preventing cycling of the temperature of the outlet water.

While the preferred embodiments of the invetnion include a heater disposed exteriorly of the bulb because the heat delivered by said heater is rapidly withdrawn with the outflowing water when the water heater is operating at or near to full capacity, so that the false temperature produced by the heater associated with the bulb exists only at lower rates of water flow, it is within the broader aspects of the present invention to dispose the heater interiorly of the bulb when it is desirable under the conditions of service that a false temperature be imparted to the bulb whenever the steam inlet valve is open. In the latter event the heater associated with the bulb may be of materially shorter overall length, whether or not it is in the form of a coil, the length of the heater being determined by the amount of heat which it is desired to impart to the charge in the bulb when the steam inlet valve is open.

While the embodiment of the invention illustrated on the drawing has been described with considerable particularity, it is to be expressly understood that the invention is not limited thereto, because as will now be apparent to those skilled in the art, changes may be made in details of construction, arrangement, proportion, etc., parts may be replaced by equivalent parts, etc., without departing from the invention. While one particular form of thermostatically operated steam valve has been illustrated and described in detail it is to be expressly understood that the invention is not limited thereto as any suitable thermostatically operated steam valve may be used. The invention may also be applied to any suitable form of water heater. While one particular form of heater for the bulb chamber has been illustrated and described with considerable detail it is also to be expressly understood that the invention in its broader aspects is not limited thereto as the size, arrangement and relationship of the heater to the bulb as well as the form and construction of the heater itself, may be varied within wide limits, so long as the heater in its association with the bulb in the bulb housing has the capacity to operate in conformity with the principles herein explained. Also, while a preferred form of bulb has been illustrated and described in detail, it is to be expressly understood that the advantages flowing from the use of the heater are obtainable when using bulbs of conventional or other construction. Reference is therefore to be had to the appended claims for a definition of the invention.

What is claimed is:

1. In a temperature control for a water heater of the type including a shell, a water inlet and a water outlet associated therewith, inlet means for conveying steam thereto, a valve for controlling said inlet means and a thermostat for operating said valve including a bulb, the combination of a housing for said bulb communicating with said water outlet and having an outlet therefrom, and a heater for said bulb disposed in said bulb housing between the outer wall of said bulb and the inner wall of said housing and communicating with said inlet means at the outlet side of said valve for conveying steam into proximate heat transfer relation to said bulb.

2. In a temperature control for a water heater of the type including a shell, a water inlet and a water outlet associated therewith, inlet means for conveying steam thereto, a valve for controlling said inlet means and a thermostat for operating said valve including a bulb, the combination of a housing for said bulb communicating with said water outlet and having an outlet therefrom, a heater for said bulb disposed wholly within said bulb housing between the outer wall of said bulb and the inner wall of said housing, and a conduit connected to said heater and communicating with said inlet means at the outlet side of said valve for conveying steam to said heater in proximate heat transfer relation to said bulb, said bulb housing providing a substantially horizontal passage for the flow of water therethrough and having its connections to said water outlet and said outlet from said bulb housing disposed below said passage.

3. In a temperature control for a water heater of the type including a shell, a water inlet and a water outlet associated therewith, inlet means for conveying steam thereto, a valve for controlling said inlet means and a thermostat for operating said valve including a bulb, the combination of a housing for said bulb communicating with said water outlet and having an outlet therefrom, a steam heating coil wound around said bulb and disposed in said bulb housing, and a conduit for conveying steam to said coil and communicating with said inlet means at the outlet side of said valve.

4. In a temperature control for a water heater of the type including a shell, a water inlet and a water outlet associated therewith, inlet means for conveying steam thereto, a valve for controlling said inlet means and a thermostat for operating said valve including a bulb, the combination of a housing for said bulb communicating with said water outlet and having an outlet therefrom, a steam heating coil wound around said bulb and disposed in said bulb housing, and a conduit for conveying steam to said coil and communicating with said inlet means at the outlet side of said valve, said coil having spaced turns at least the most of which are out of contact with but disposed closely adjacent to said bulb.

5. In a temperature control for a water heater of the type including a shell, a water inlet and a water outlet associated therewith, inlet means for conveying steam thereto, a valve for controlling said inlet means and a thermostat for operating said valve including a bulb, the combination of a housing for said bulb communicating with said water outlet and having an outlet therefrom, a steam heating coil wound around said bulb and disposed in said bulb housing, and a conduit for conveying steam to said coil and communicating with said inlet means at the outlet side of said valve, said coil comprising a plurality of spaced turns extending throughout the length of said bulb.

6. In a temperature control for a water heater of the type including a shell, a water inlet and a water outlet associated therewith, inlet means for conveying steam thereto, a valve for controlling said inlet means and a thermostat for operating said valve including a bulb, the combination of a housing for said bulb communicating with said water outlet and having an outlet therefrom, a steam heating coil wound around said bulb and disposed in said bulb housing, and a conduit for conveying steam to said coil and communicating with said inlet means at the outlet side of said valve, said coil comprising inlet and outlet sections the turns of which are arranged in alternation.

7. In a temperature control for a water heater of the type including a shell, a water inlet and a water outlet associated therewith, inlet means for conveying steam thereto, a valve for controlling said inlet means and a thermostat for operating said valve including a bulb, the combination of a housing for said bulb communicating with said water outlet and having an outlet therefrom, a steam heating coil wound around said bulb and disposed in said bulb housing, and a conduit for conveying steam to said coil and communicating with said inlet means at the outlet side of said valve, said coil comprising inlet and outlet sections the turns of which are arranged in alternation and so disposed that the fluid is flowing through the outlet section around the bulb in the opposite direction from that in which the fluid is flowing around the bulb in the inlet section.

WILLIAM W. CARSON, JR.

REFERENCES CITED

The following references are of record in the file of this patent:

UNITED STATES PATENTS

| Number | Name | Date |
|---|---|---|
| 1,359,107 | Roesch | Nov. 16, 1920 |
| 2,135,216 | Olson | Nov. 1, 1938 |
| 2,190,232 | Fry | Feb. 13, 1940 |
| 2,430,837 | Tutein | Nov. 11, 1947 |

FOREIGN PATENTS

| Number | Country | Date |
|---|---|---|
| 313,916 | Great Britain | Sept. 1, 1930 |